United States Patent [19]
Wood

[11] Patent Number: 5,525,869
[45] Date of Patent: Jun. 11, 1996

[54] EFFICIENT BATTERY OPERATED INVERTER CIRCUIT FOR CAPACITIVE LOADS SUCH AS ELECTROLUMINESCENT LAMPS

[75] Inventor: Grady M. Wood, Melbourne, Fla.

[73] Assignee: Harris Corporation, Melbourne, Fla.

[21] Appl. No.: 490,566

[22] Filed: Jun. 15, 1995

[51] Int. Cl.$^6$ .................................................. G09G 3/10
[52] U.S. Cl. .............................. 315/169.3; 315/209 R; 315/224; 315/226; 315/291; 315/308; 315/DIG. 7
[58] Field of Search ........................... 315/169.3, 170, 315/172, 209 R, 224, 226, 287, 291, 300, 302, 308, 314, DIG. 7

[56] References Cited

U.S. PATENT DOCUMENTS

| | | | |
|---|---|---|---|
| 4,253,097 | 2/1981 | Hochstrate | 315/169.3 X |
| 4,527,096 | 7/1985 | Kindlmann | 315/169.3 |
| 4,937,647 | 6/1990 | Sutton | 315/169.3 X |
| 5,027,040 | 6/1991 | Ikeda et al. | 315/241 R |
| 5,313,141 | 5/1994 | Kimball | 315/169.3 |
| 5,323,305 | 6/1994 | Ikeda et al. | 315/291 X |
| 5,336,978 | 8/1994 | Alessio | 315/169.3 |
| 5,347,198 | 9/1994 | Kimball | 315/167 |

*Primary Examiner*—Robert Pascal
*Assistant Examiner*—Haissa Philogene
*Attorney, Agent, or Firm*—Nixon, Hargrave, Devans & Doyle

[57] ABSTRACT

In a switching inverter where transistor switches are controlled so as to provide current through an inductor which is connected in series with the switches across a battery so as to power a capacitive load (such as an electroluminescent lamp) with higher voltage than the battery voltage, control current for the switches and particularly the emitter to base current therethrough is shared by connecting the bases of these transistors via a current limiting resistor. Using the same base current reduces the battery drain and improves the efficiency (power applied to the load versus battery power drawn) of the inverter.

11 Claims, 1 Drawing Sheet

EFFICIENT BATTERY OPERATED INVERTER CIRCUIT FOR CAPACITIVE LOADS SUCH AS ELECTROLUMINESCENT LAMPS

SUMMARY

The present invention relates to inverter circuits for driving a capacitive load at a voltage higher than a supply voltage by switching current through an inductor which is connected to the load, and particularly to inverter circuits using a switched inductor which is resonant with a capacitive load which applies a AC voltage across the load at lower frequency than the frequency at which current therethrough is switched.

The invention is especially suitable for use in improving the efficiency of inverter circuits which are used to power devices which present a capacitive load, such as an electroluminescent lamp, and especially to improve the efficiency of electroluminescent lamp driving inverter circuit such as shown in U.S. Pat. No. 5,313,141 issued May 17, 1994 to R. A. Kimball. Inverter circuits for driving capacitive loads especially electroluminescent lamps enables such lamps to be used in miniature devices such as pagers and wristwatches. Such watches use very low voltage (1–3 volt) batteries, and inverter circuits are required for providing voltage sufficient to operate the lamp. Such inverter circuits may also be of the H-bridge type such as shown in Kindlmann, U.S. Pat. No. 4,527,096 issued Jul. 2, 1985 as well as inverter circuit or described in the above-referenced Kimball patent.

The problem of efficiency and reduced battery drain is particularly pressing in the case of integrated circuit electroluminescent lamp drivers such as discussed in the above-referenced patents. Such drivers have been designed and built both with CMOS and bipolar technology. These lamp drivers are used in low voltage battery operated environments such as in watches. Accordingly, an object of the invention is to deliver the maximum charge to the electroluminescent lamp load while minimizing battery drain.

In watch applications, the peak current through the inductor in the inverter of the driver is typically 10 to 30 milliamps (ma). This peak current and the available area in the package (the watch case) determines the size of the inductor switching transistors. The transistors which switch the current through the inductor are referred to as the inductor driver transistors. If a bipolar transistor is used for a driver transistor, the size of that transistor can be smaller than a CMOS device of the same current carrying capability. This size advantage results from the fact that the required switching speeds are slow enough to allow the bipolar transistor to saturate and take advantage of the resulting collector conductivity modulation. Bipolar transistors suffer from the disadvantage of requiring base current. Such base current is the control current which turns these transistors on and off so as to switch the current through the inductor. Such base current is not supplied to the load and detracts from overall efficiency. In the design described in the above-referenced Kimball patent, there may be two bipolar driving transistors in series with the inductor and the battery. Each of these transistors requires control current, namely base drive. Because of process and temperature variations, the forced beta or $H_{fe}$ of the transistor design must be significant lower than the typical beta of the transistors themselves. The total of the two base currents can represent greater than 50% of the total bias currents (those currents that do not flow through the inductor). In the inverter either an H bridge or other switches (either transistor switches or SCRs) may be used to provide paths for current in opposite directions so as to charge and discharge the capacitive load; in other words to provide an AC voltage across the load of sufficient magnitude to cause the desired effect (luminescence in an electroluminescent lamp where the lamp is the load).

It has been found in accordance with this invention that the efficiency of such inverter circuits and especially circuits of the type shown in the Kimball patent (see FIG. 6 thereof) can be improved by sharing the current which is used to control the devices which switch the current through the inductor. By efficiency is meant the ratio of power supplied to the load over power drawn from the battery. Thus inverter circuits provided by the invention enable the charge applied to the load to be maintained, while minimizing battery drain. Another feature of the invention is to improve efficiency of the circuitry without complicating the circuit design and especially with a circuit design, facilitating the integration of the circuitry into a chip which may readily be installed in a wristwatch, electroluminescent lamp, or other miniature pager device.

Briefly described, the invention provides an improvement in an inverter for powering a load which presents a capacitive impedance. The inverter includes an inductor connected to the load via first switching devices which pass main current obtained from a battery which appears to the load at higher than the battery voltage across the inductor. A pair of second switching devices are connected in series with the inductor. The switched main current flows through the inductor and these second switching devices, to obtain an alternating polarity voltage across the load which is of a peak magnitude higher than the battery voltage. The improvement reduces the current used in operating the second switching devices thereby increasing the efficiency of the inverter. The improved inverter uses a circuit for passing control current through the second switching devices for controlling switching of the main current by the second devices. Also the invention utilizes means, connecting the control current passing circuit in common with the second switching devices, so that the control current is shared by these second switching devices.

Accordingly it is the principal object of the present invention to provide an improved inverter, driver circuit for a capacitive load wherein control current is shared thereby reducing the battery drain and improving the efficiency of the circuit.

It is a further object of the present invention to improve drive circuits for electroluminescent devices and especially drive circuits of the type shown in the above-referenced Kimball patent.

The foregoing and other features objects and advantages of the invention will become more apparent from a reading of the following description in connection with the accompanying drawing.

DETAILED DESCRIPTION

Figure 1:
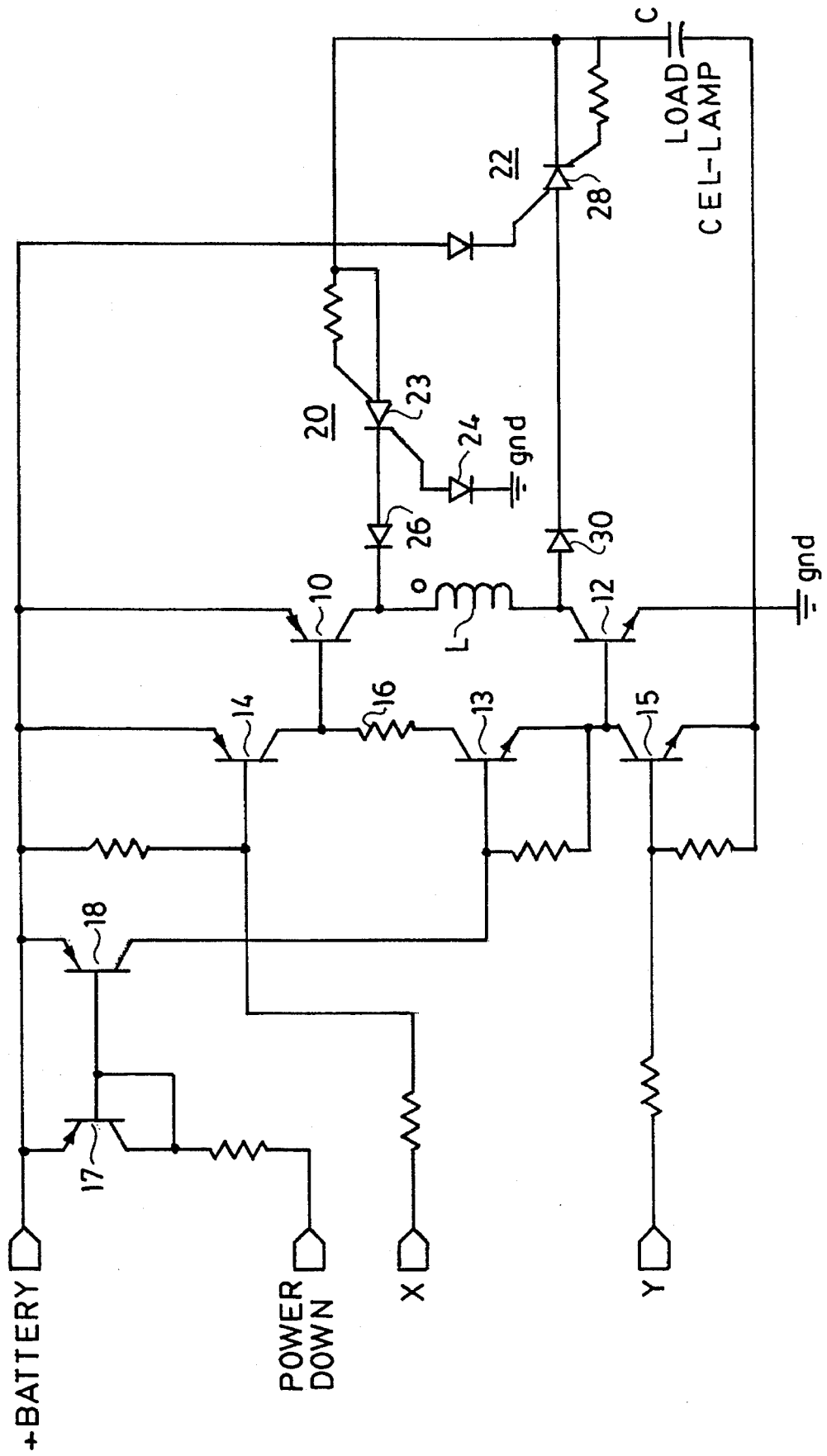
FIG. 1 which shows an inverter, driver circuit for a capacitive load, which may be an electroluminescent lamp.

Referring to FIG. 1 the driver circuit of the driver circuit is labeled L while the load, which may be an electroluminescent lamp, is labeled C. Bipolar transistors of opposite conductivity type, namely PNP transistor 10 and NPN transistor 12, are connected on opposite sides (or to opposite terminals) of the inductor L and in series with the inductor L across a battery (not shown). The battery is connected to the terminals labeled + Battery and ground. These transistors 10 and 12 are the driver transistors providing the switching devices which switch current through the inductor L. They are integrated with control transistors 14 and 15 to provide the entire switching device. It will be appreciated that the first of these switching devices consisting of transistors 10 and 14 of the same conductivity type (PNP) and transistors 12 and 15 which are also of the same conductivity type (NPN) but opposite to the conductivity type of the transistors 10 and 14 may be replaced with another switching device such as an SCR. The control voltages are applied via resistors from terminals indicated as X and Y which are connected to the bases of the control transistors 14 and 15. The control signals applied to these terminals X and Y may be the same as shown in FIG. 7 of the Kimball patent which is referenced above. The control circuit is provided by a resistor 16 and another bipolar transistor 13. The conductivity type of the transistor 13 depends upon the conductivity types of the control and driver transistors of the switching devices which switch the current through the inductor. The conductivity type is selected so as to enable control current to flow between the bases or control terminal of the driving transistors 10 and 12. Accordingly, in the illustrated implementation of this invention transistor 13 is of the NPN type.

In order to enable the inverter circuit, namely the chip on which the inverter circuit is disposed, a power down control signal is applied to the bases of PNP transistors 17 and 18. The collector emitter path of transistor 18 is connected to the base of the control circuit transistor 13. The driver inverter is enabled by applying a low level signal (ground) to the power down terminal. Then transistor 18 supplies base current to transistor 13 which then becomes conductive (turns on).

The devices which switch the current which charge and discharge the load C are switches 20 and 22 which are shown as SCR switches which are automatically triggered by the transient voltage appearing across the inductor. The transient or auto-triggering circuits 20 and 22 are described and claimed in another application, which is being filed concurrently with the application Ser. No. 08/490,016, in the name of the inventor of this application. Such auto triggered switching is used in a preferred embodiment of the inverter driving circuit. Optionally, separately controlled switches such as utilize SCRs 73 and 74, respectively switched by control signal operated transistors 91 and 92, as shown in FIG. 6 of the above-reference Kimball patent may be used in practicing the invention of the application.

Briefly, the auto triggered switches 20 and 22 are triggered by transients which appear across the inductor L and are applied to these switches as the main current, from and to the inductor to and from load C, switches direction, and in synchronism therewith, via blocking diodes 26 and 30. Diodes 24 and 25, which are connected to the triggering electrodes of the SCRs 23 and 28, form a capacitance sufficient to set off a regenerative action which triggers the SCRs 23 or 28 upon occurrence of a voltage spike (a transient) in a direction which enables current flow through the reflective blocking diode 26 and 30. Accordingly each time the voltage across the inductor is cycled by the switching of the current in the inductor via the driver transistors 10 and 12, a transient occurs which triggers one of the switching devices 20 or 22 and enables current to flow either to the load via the switch 22 or from the load via the switch 20.

Returning again to the operation of the driver transistors 10 and 12 and their control transistors 14 and 15, the driver transistors 10 and 12 are capable of supplying the 10 to 30 ma needed to obtain the voltage for the load due to the resonant circuit created by the inductor L and the capacitive load circuit C. These transistors suitably have a beta, also known as $H_{fe}$, of about 30. The invention capitalizes on conductivity modulation and enables the size of the transistors 10 and 12 to be small enough to be integrated in an integrated circuit with the rest of the inverter, except for the inductor and the load (lamp) which may be off chip devices.

In the FIG. 6 circuit shown in the above-referenced Kimball patent a driver transistor operating at 30 ma peak current and having an $H_{fe}$ of 30 would require 1 ma. The transistor remains on for the entire half cycle of the AC voltage across the load (the lamp). The other transistor which is pulsed during the half cycle may be pulsed with pulses at a duty cycle typically greater than 75%. This results in an average base drive requirement for the driver transistors (70 and 71 of Kimball FIG. 6) of 1.75 ma.

Consider the circuit of FIG. 1 hereof. During the first half cycle of the output voltage where the voltage across the load is positive with respect to ground and after the chip is enabled by applying a suitable powerdown level as explained above, the X input goes high (towards plus battery voltage). Then driver transistor 14 is off. The Y input is cycled with pulses at a much higher frequency than the frequency of the alternating voltage across the load. Thus controlled transistor 15 is cycled on and off during the half cycle. When transistor 15 is off, the current flow is through the emitter base junction of driver transistor 10, then through resistor 16 of the control circuit, and then through transistor 13 of the control circuit to return to ground through the base emitter path in driver transistor 12.

The control current to the driver transistors is shared. In other words the same base current drawn from the base of driver transistor 10 is returned to the base of the other driver transistor 12.

In the example given above where the base drive requires 1.75 ma, this base drive is divided in half to approximately 870 microamps (μa). The base currents of the control transistors 14 and 15 nevertheless drain the battery, but this drain is quite small compared to the 1.75 ma needed in the implementation shown in the Kimball patent. The net current savings is approximately 600 microamps. Because of this current saving, the efficiency of the inverter driver circuit is enhanced.

Although a resistor 16 is used in the control circuit of the implementation describes herein, invention may be implemented with dynamic current control devices in the control current circuit. For most applications where the battery voltage varies over a relatively small range (say less than half a volt for a 3.0 volt battery) a resistor for limiting the current is believed to be sufficient.

Variations and modifications in the herein described circuits, within the scope of the invention will undoubtedly suggest themselves to those skilled in the art. Accordingly, the foregoing description should be taken as illustrative and not in a limiting sense.

I claim:

1. In an inverter for powering a load which presents a capacitive impedance, which inverter includes an inductor connected to said load via first switching devices disposed between the load and the inductor which, first switching devices pass current obtained from a battery in opposite directions to said load and a second pair of switching devices connected in series with said inductor through which main current flows in opposite directions with respect to said load, an improvement comprises a circuit connected between the second switching devices for passing control current from one of said second switching devices to the other of said second switching devices for controlling switching of said main current by said second devices.

2. The improvement according to claim 1, wherein said second switching devices have control terminals and said control current circuit interconnects the control terminals of said second switching devices.

3. The improvement according to claim 2, wherein said second switching devices comprise first and second transistors, said control terminals are the bases of said first and second transistors and said control circuit connects said bases so that the base current of said transistors is said shared control current.

4. The improvement according to claim 3, wherein said second switching devices further comprise third and fourth transistors which are respectively connected in driving relationship with said first and second transistors.

5. The improvement according to claim 4, wherein said third and fourth transistors are bipolar transistors of opposite conductivity types (PNP and NPN) and are connected in series with said control circuit and battery polarized to pass battery current through said third and fourth transistors on said control circuit when said third and fourth transistors are conductive.

6. The improvement according to claim 5, wherein said first and third transistors are of the same conductivity type and said second and fourth transistors are of the same conductivity type.

7. The improvement according to claim 6, wherein said control circuit includes a fifth transistor of the same conductivity type as one of said first and second transistors to enable current flow between the bases of the first and second transistors.

8. The improvement according to claim 7, wherein said control circuit includes a resistor connected between the control terminals (bases) of said first and second transistors via the collector and the emitter of the fifth transistor.

9. The improvement according to claim 8, wherein said control circuit further comprises means operated by an enabling system for rendering said fifth transistor conductive.

10. The improvement according to claim 9, wherein said load is an electroluminescent lamp.

11. The improvement according to claim 9, wherein said inverter, except for said inductor and load, are integrated into an integrated circuit chip structure.

* * * * *